No. 785,944. PATENTED MAR. 28, 1905.
W. C. FOWNES, Jr.
ROLLER BEARING.
APPLICATION FILED NOV. 15, 1904.
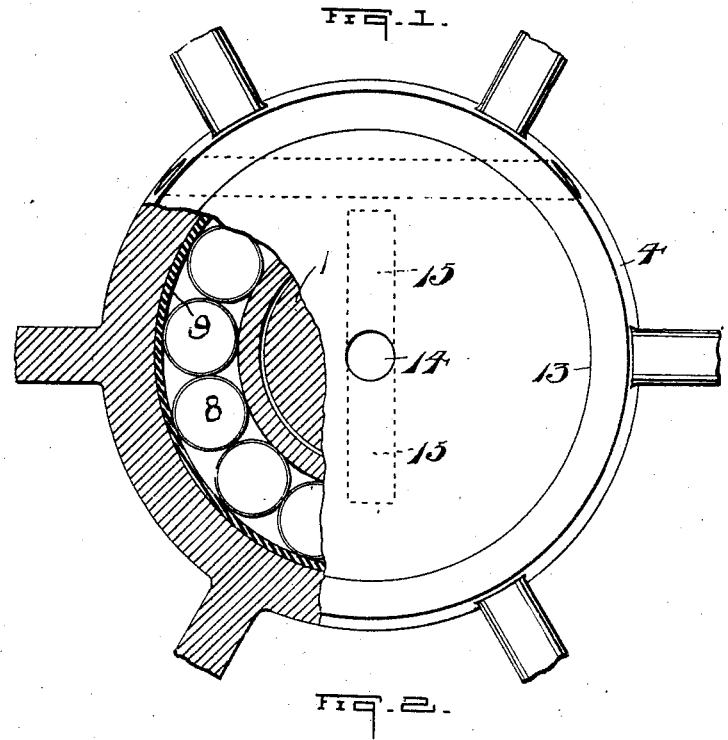
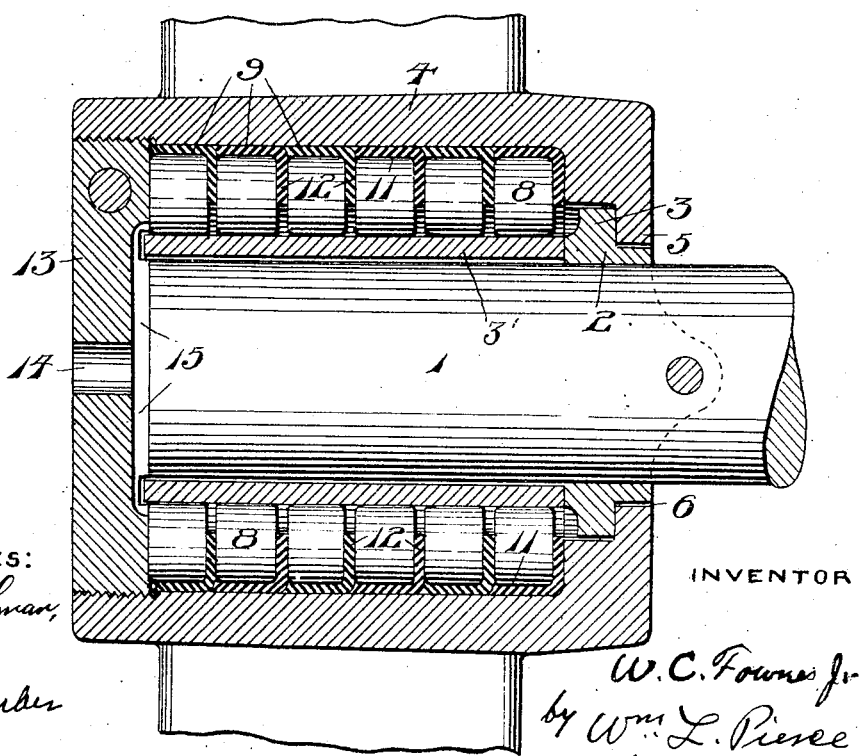
WITNESSES:
INVENTOR
W. C. Fownes Jr.
by Wm L. Pierce
his ATTORNEY No. 785,944.

Patented March 28, 1905.

UNITED STATES PATENT OFFICE.

WILLIAM C. FOWNES, JR., OF PITTSBURG, PENNSYLVANIA.

ROLLER-BEARING.

SPECIFICATION forming part of Letters Patent No. 785,944, dated March 28, 1905.

Application filed November 15, 1904. Serial No. 232,824.

*To all whom it may concern:*

Be it known that I, WILLIAM C. FOWNES, Jr., a citizen of the United States, residing at Pittsburg, in the county of Allegheny and State of Pennsylvania, have invented or discovered new and useful Improvements in Roller-Bearings, of which the following is a specification.

My invention relates to roller-bearings, with special reference to mining-cars, but not limited thereto, as they may be used wherever antifriction-bearings are desired.

With bearings having long antifriction-rollers the latter soon turn so as not to lie strictly parallel to the axle, but form a slight angle therewith. The rollers have free movement as long as they lie parallel to the axle; but upon their lying at an angle therewith they become wedged or crowded into spaces which are smaller than those in the plane of the axle and a roller parallel thereto, because of the curvature of the outer bearing for the rollers.

It is one of the objects of my invention to provide means whereby the rollers will remain parallel to the axis.

Another object I aim to secure is to provide treads for the rollers which will not wear rapidly and can be easily replaced when desired.

Other objects and points of novelty of my invention will appear in the detailed description thereof and the claims hereto appended.

In the drawings which form a part hereof, Figure 1 is an end elevation of the hub portion of a wheel, showing my invention, a portion of the end of the hub being broken away and showing the interior. Fig. 2 is a longitudinal vertical section through the center of the hub, the axle being shown in side elevation.

Referring now the drawings for a detailed description of my invention, 1 designates an axle provided with the preferably close-fitting fixed collar 2, having the outwardly-extending annular flange or rib 3. On the axle, between the outer end thereof and the outer end of the collar 2, I place the sleeve 3'. The hollow hub 4 of the wheel has at its inner side the inturned annular flange 5, parallel to the flange 3 and forming an opening 6, in which the sleeve 2 fits, the forward or outer face of the flange 5 abutting against the rear or inner face of the flange 3 to prevent the hub from sliding outwardly. Between the sleeve 3' and the interior wall 7 of the hub is an annular space occupied by the rollers 8 and their races or guideways 9. The space between the hub and sleeve is not occupied by parallel rollers whose length is approximately that of the sleeve 3', but of parallel rows of short or sectional rollers having their adjacent ends spaced apart. I do not prescribe any definite length for the rolls; but I have found that they work satisfactorily when their diameter exceeds their length. I place the rollers in annular raceways formed by the races 9, having the annular tread or wearing portion 11 and the inturned flange 12. The treads have a width substantially equal to the length of each roller, and the flanges 12 extend between the ends of adjacent rollers and over the inner end of the inner roller. Each roller is confined at its ends between the flanges of adjacent races, except that each outer roller is confined between one flange 12 and the hub-cap 13, which is screwed into the hub 4 and preferably against the said outer race. The races are preferably annular angle-irons having a common axis, their inturned members being parallel and their treads forming an abutting series. The rollers in each annular series are preferably in rolling contact, as shown. The races are made, preferably, of case-hardened steel and serve as lining for the relatively soft metal of the hub.

The cap 13 has the central oil-hole 14, which communicates at its inner end with branch oil-ducts 15, leading to the wearing parts of the bearings. The oil has access to the spaces between the axle and sleeve and between the sleeve and the hub, whereby all parts may be well lubricated and injurious wear on the parts prevented. The collar 2 should fit the axle so as to prevent the escape of oil between them, and there is no place for the escape of oil except between the flanges 3 and 5, and as there are no parts in contact with them to feed the oil to them there will be practically no loss there.

It will be seen that I have produced a roller-bearing capable of a variety of uses, having its parts easily and cheaply constructed. The wearing parts are all preferably of hard steel, insuring but little wearing away thereof and requiring but little repairing, which can be done quickly at a very small cost, as the parts which wear are exchangeable for new parts without any change in the body of the wheel. The parts are all arranged to be equally oiled, and the waste of the oil is prevented.

While I have described my invention with considerable minuteness, I do not desire to be restricted to the details shown, as they may be departed from without sacrificing the principles thereof.

Having described my invention, I claim—

1. In a roller-bearing, an axle, a hub thereon, a plurality of annular rows of rollers arranged around the axle and within the hub, and means for maintaining the axes of the rollers parallel to the axle, said means composed of annular spacers between the adjacent rows and annular treads for the rows between the hub and the said rows.

2. In a roller-bearing, an axle, a hub thereon, a series of races within the hub and surrounding the axle, each race having an annular tread parallel to the axle and an annular flange extending toward the axle, in combination with an annular series of rollers confined transversely between the axle and tread and longitudinally between adjacent flanges.

3. In a roller-bearing, an axle, a hub thereon, a series of cup-shaped races concentric with the axle and within the hub, the edges of the races extending toward the bottoms of adjacent races, and a series of rollers in the annular raceways within the flanges of the races.

4. In a roller-bearing, an axle, a hub thereon, a plurality of annular rows of rollers between the hub and the axle, spacers between the rows, and treads integral with the spacers between the hub and the rows.

5. In a roller-bearing, an axle, a hub thereon, a plurality of annular rows of rollers arranged around the axle and within the hub, means for maintaining the axes of the rollers parallel to the axle, said means composed of annular spacers between the adjacent rows and annular treads for the rows between the hub and the said rows, and a sleeve between the axle and the rollers.

Signed at Pittsburg this 11th day of November, A. D. 1904.

WILLIAM C. FOWNES, JR.

Witnesses:
F. N. BARBER,
A. M. STEEN.